United States Patent
Kuo et al.

(10) Patent No.: US 9,285,622 B2
(45) Date of Patent: Mar. 15, 2016

(54) TOUCH PANEL AND MANUFACTURING METHOD

(71) Applicant: RTR-TECH TECHNOLOGY CO., LTD., Tainan (TW)

(72) Inventors: Hsiao-Wen Kuo, Tainan (TW); Wei-Chuan Chen, Tainan (TW)

(73) Assignee: RTR-TECH TECHNOLOGY CO., LTD., Shanhua Dist., Tainan (TW)

( * ) Notice: Subject to any disclaimer, the term of this patent is extended or adjusted under 35 U.S.C. 154(b) by 141 days.

(21) Appl. No.: 13/934,199

(22) Filed: Jul. 2, 2013

(65) Prior Publication Data

US 2014/0016045 A1   Jan. 16, 2014

(30) Foreign Application Priority Data

Jul. 12, 2012   (TW) .............................. 101125155 A

(51) Int. Cl.
*G02F 1/1333* (2006.01)
*G02F 1/1335* (2006.01)

(52) U.S. Cl.
CPC ...... *G02F 1/13338* (2013.01); *G02F 1/133528* (2013.01); *Y10T 156/10* (2015.01)

(58) Field of Classification Search
CPC ........... G02F 1/133528; G02F 1/13338; Y10T 156/10
USPC ............................... 349/12, 96; 345/173, 174
See application file for complete search history.

(56) References Cited

U.S. PATENT DOCUMENTS

| | | | |
|---|---|---|---|
| 6,051,289 A * | 4/2000 | Tsujimoto et al. ............ 428/1.31 |
| 2010/0066650 A1 * | 3/2010 | Lee et al. ......................... 345/64 |
| 2010/0231549 A1 * | 9/2010 | Chien et al. .................... 345/174 |
| 2011/0128240 A1 * | 6/2011 | Choi ............................. 345/173 |
| 2014/0016044 A1 * | 1/2014 | Tung et al. ....................... 349/12 |
| 2015/0064628 A1 * | 3/2015 | Guo ............................... 430/316 |

FOREIGN PATENT DOCUMENTS

| TW | 200943157 | 10/2009 |
| TW | 201135318 | 10/2011 |
| TW | 201142415 | 12/2011 |

* cited by examiner

*Primary Examiner* — Dung Nguyen
*Assistant Examiner* — Tai Duong
(74) *Attorney, Agent, or Firm* — Winston Hsu; Scott Margo

(57) ABSTRACT

A touch panel includes a liquid crystal unit, a lower polarizer, an upper polarizer and a touch sensing structure. The lower polarizer is installed under the liquid crystal unit, the upper polarizer is installed above the liquid crystal unit, and the touch sensing structure is installed under the upper polarizer.

6 Claims, 6 Drawing Sheets

TOUCH PANEL AND MANUFACTURING METHOD

BACKGROUND OF THE INVENTION

1. Field of the Invention

The present invention relates to a touch panel, and more particularly, to a touch panel and a manufacturing method capable of maintaining good display quality and having a touch function.

2. Description of the Prior Art

In current consumer electronic product market, touch panels have been widely utilized as data communication interfaces in consumer electronic products, such as personal digital assistants (PDA), mobile phones, notebooks and tablet PCs. In addition, since design of current consumer electronic products tends to be light, slim, short and small, there is usually no enough space to accommodate a conventional input device such as a keyboard or a mouse in a consumer electronic product. Especially under huge requirement of table PCs emphasizing user-friendly design, the touch panel has become one of key components. The touch panel not only can meet requirements of multi-layer menu design, but also can provide functions of the keyboard and mouse as well as handwriting input for user friendly operations. Particularly, the touch panel, which integrates input and output functions into a same interface (screen), has more advantages than other conventional input devices.

Current flat panel displays with touch function can be made by various manufacturing methods and have different structures. A touch sensor panel is produced independently in earlier time, and is then combined with a liquid crystal display panel having corresponding dimensions after completing production of the touch sensor panel. Therefore, for manufacturing the flat panel display with the touch function, one of the most direct method is to affix the touch sensor panel on a upper surface of a front panel of the liquid crystal display panel by applying an adhesive layer, wherein the liquid crystal display panel sequentially comprises an upper polarizer, an upper glass plate, a liquid crystal layer, a lower glass plate and a lower polarizer stacked from top to bottom. The touch sensor panel is affixed to a side of the upper polarizer of the liquid crystal display panel by the adhesive layer.

However, during development process of the above touch control flat panel display, a problem of low visibility may be occurred, that is to say, since the touch sensor panel has a multi-layer structure, after light passing through the liquid crystal display panel and the touch sensor panel with the multi-layer structure, optical characteristics of light transmittance and visual angle compensation are easy to be insufficient, so as to limit visibility of the touch control flat panel display.

SUMMARY OF THE INVENTION

An object of the present invention is to provide a touch panel and a manufacturing method capable of maintaining good display quality and having a touch function.

To achieve the above object, a touch panel of the present invention comprises a liquid crystal unit, a lower polarizer, an upper polarizer and a touch sensing structure. The lower polarizer is installed under the liquid crystal unit. The upper polarizer is installed above the liquid crystal unit. The touch sensing structure is installed under the upper polarizer.

To achieve the above object, the touch sensing structure of the present invention comprises an upper transparent sensing series and a lower transparent sensing series, wherein the upper transparent sensing series is formed on the upper polarizer, the lower transparent sensing series is formed on a first transparent substrate, and the first transparent substrate is affixed under the upper polarizer.

To achieve the above object, the touch sensing structure of the present invention comprises an upper transparent sensing series and a lower transparent sensing series, wherein the upper transparent sensing series is formed on a first transparent substrate, the lower transparent sensing series is formed on a second transparent substrate, and the second transparent substrate is affixed under the first transparent substrate.

To achieve the above object, the first transparent substrate and the second transparent substrate are made of a low-retardation material.

To achieve the above object, the touch sensing structure comprises an upper transparent sensing series and a lower transparent sensing series, wherein the upper transparent sensing series and the lower transparent sensing series are formed and intersected on the upper polarizer.

To achieve the above object, a transparent conductive layer is formed under the upper polarizer, and the transparent conductive layer is patterned to form the intersected upper transparent sensing series and lower transparent sensing series.

To achieve the above object, a protective layer is installed above the upper polarizer of the present invention.

To achieve the above object, a manufacturing method of a touch panel of the present invention comprises providing a liquid crystal unit; providing a lower polarizer affixed under the liquid crystal unit; and providing an upper polarizer affixed above the liquid crystal unit, the upper polarizer having a lower surface, wherein an upper transparent sensing series and a lower transparent sensing series are formed on the lower surface.

To achieve the above object, a manufacturing method of a touch panel of the present invention comprises providing a liquid crystal unit; providing a lower polarizer affixed under the liquid crystal unit; providing an upper polarizer having a lower surface, wherein an upper transparent sensing series is formed on the lower surface; providing a first transparent substrate, wherein a lower transparent sensing series is formed on the first transparent substrate; affixing the upper polarizer and the first transparent substrate by roll-to-roll adhesion; and affixing the upper polarizer and the first transparent substrate above the liquid crystal unit.

To achieve the above object, a manufacturing method of a touch panel of the present invention comprises providing a liquid crystal unit; providing a lower polarizer affixed under the liquid crystal unit; providing an upper polarizer; providing a first transparent substrate, wherein an upper transparent sensing series is formed on the first transparent substrate; providing a second transparent substrate, wherein a lower transparent sensing series is formed on the second transparent substrate; affixing the upper polarizer, the first transparent substrate and the second transparent substrate together by roll-to-roll adhesion; and affixing the upper polarizer, the first transparent substrate and the second transparent substrate above the liquid crystal unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
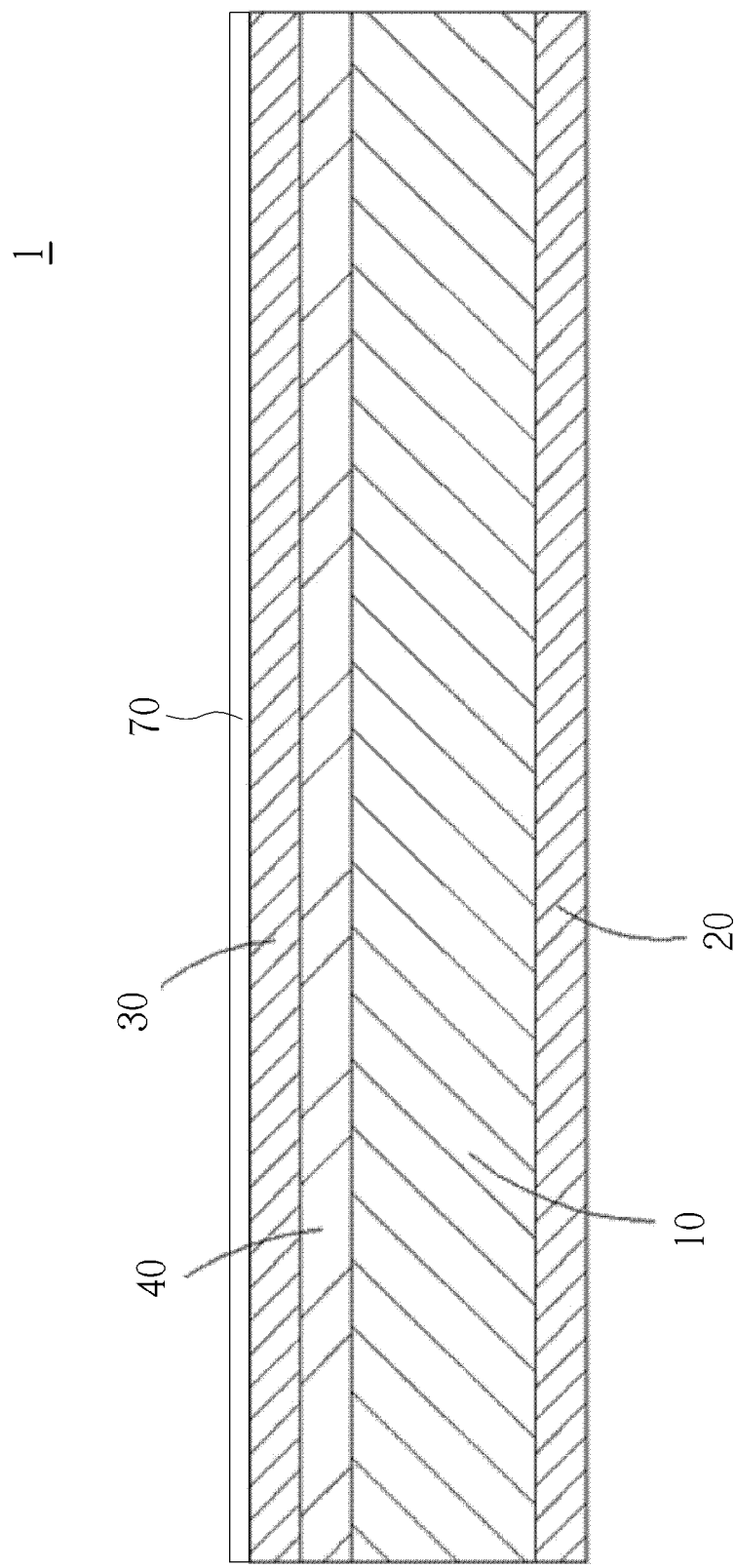
FIG. 1 is diagram showing a touch panel of a first embodiment of the present invention.
Figure 2:
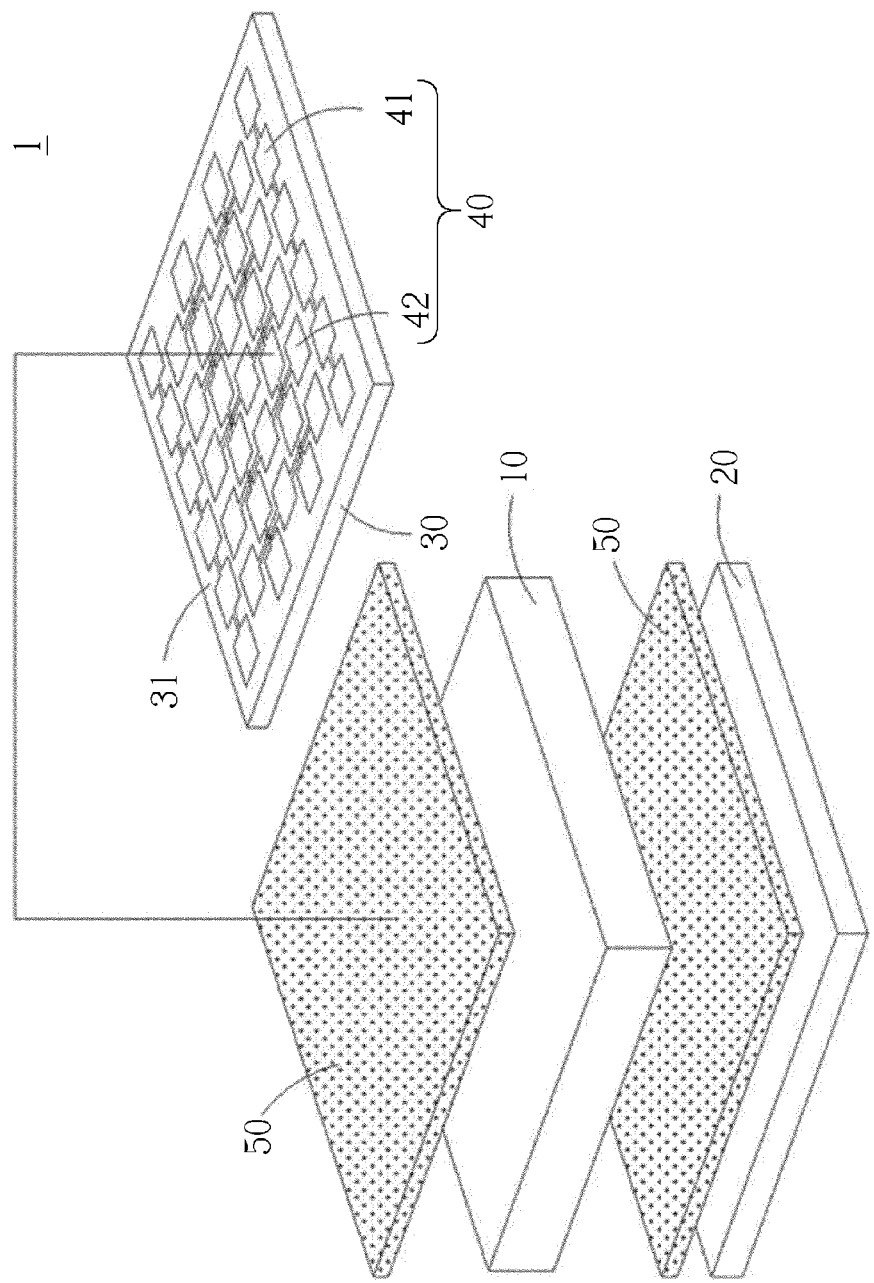
FIG. 2 is an exploded view diagram of the touch panel of the first embodiment of the present invention.

As shown in FIG. 1, which is a diagram showing a touch panel of a first embodiment of the present invention, the touch panel 1 of the present invention comprises a liquid crystal unit 10, a lower polarizer 20, an upper polarizer 30 and a touch sensing structure 40. The lower polarizer 20 is installed under the liquid crystal unit 10, the upper polarizer 30 is installed above the liquid crystal unit 10, and the touch sensing structure 40 is installed under the upper polarizer 30, wherein the touch sensing structure 40 comprises upper transparent sensing series and lower transparent sensing series. As shown in FIG. 2, the upper transparent sensing series 41 and the lower transparent sensing series 42 are formed and intersected on a lower surface of the upper polarizer 30. The upper transparent sensing series 41 and the lower transparent sensing series 42 are arranged on the upper polarizer 30 in a single sided ITO (SITO) configuration for forming the touch sensing structure 40. The touch sensing structure 40 can be a capacitive touch sensing structure or a resistive touch sensing structure.

During manufacturing processes of the touch panel 1, the liquid crystal unit 10 and the lower polarizer 20 are first provided to affix the lower polarizer 20 under the liquid crystal unit 10 by an adhesive layer 50. The upper polarizer 30 is then provided for sequentially forming a transparent conductive layer (not shown) and a metal layer (not shown) on a lower surface 31 of the upper polarizer 30, wherein the transparent conductive layer and the metal layer can be formed by physical vapor deposition or chemical vapor deposition. The metal layer and the transparent conductive layer are sequentially patterned by a photolithography process to form the intersected upper transparent sensing series 41 and lower transparent sensing series 42 as well as upper periphery wires and lower periphery wires. The photolithography process can be performed to pattern the metal layer and the transparent conductive layer for forming the periphery wires and the lower transparent sensing series 42 first, and an insulation structure is formed above the lower transparent sensing series 42, thereafter, the upper transparent sensing series 41 is formed above the insulation structure. Wherein the insulation structure is configured to insulate the upper transparent sensing series 41 from the lower transparent sensing series 42, and the upper periphery wires and the lower periphery wires are electrically connected to the upper transparent sensing series 41 and the lower transparent sensing series 42 respectively. In addition, other ends of the upper periphery wires and the lower periphery wires are electrically connected to upper gold fingers and lower gold fingers respectively for providing electrical connection with a flexible printed circuit board. The above coating process and photolithography process can be a roll-to-roll coating process and a roll-to-roll photolithography process respectively. Finally the upper polarizer 30 carrying the touch sensing structure 40 is affixed above the liquid crystal unit 10 in order to form the touch panel of the present invention with high light transmittance and touch function.

Figure 3:
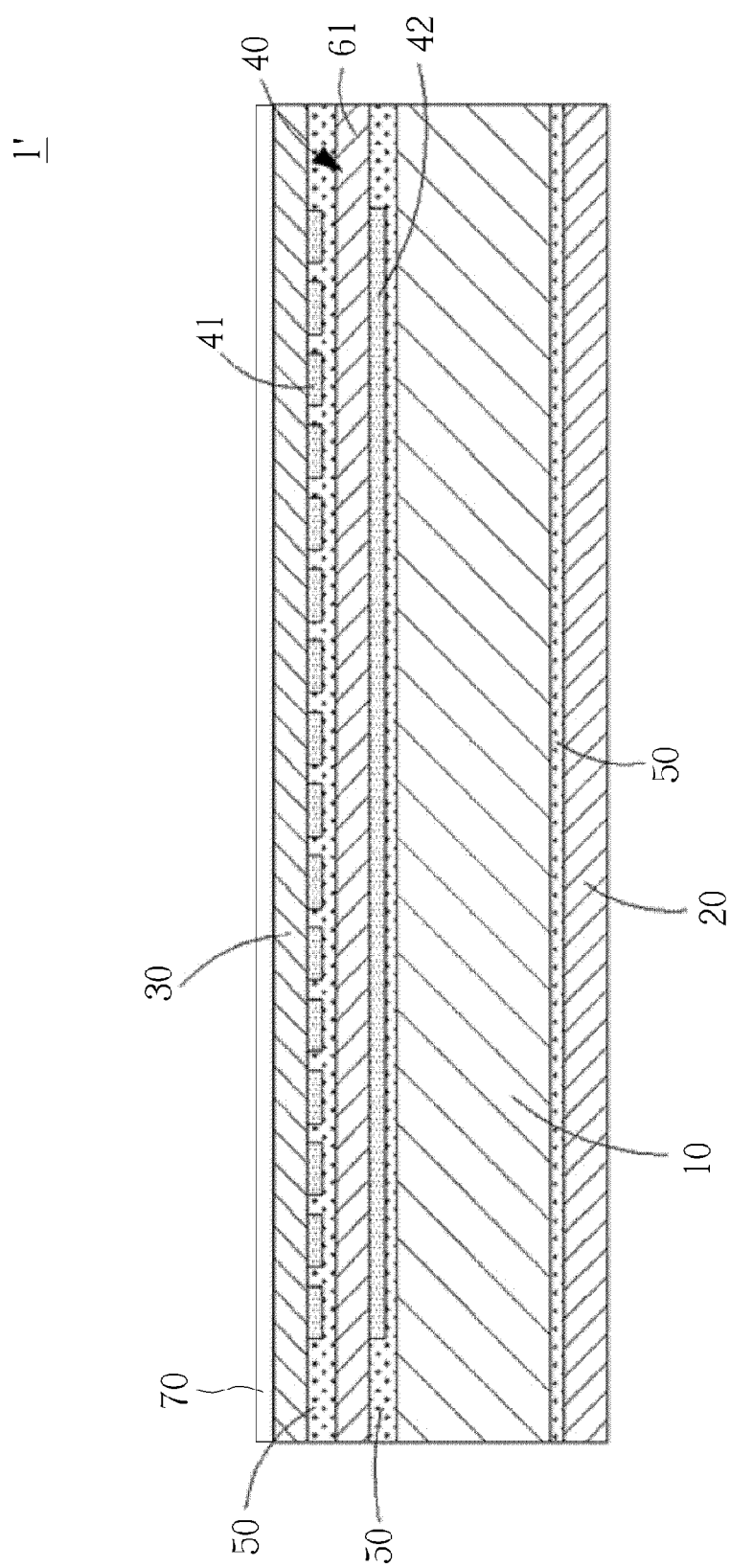
FIG. 3 is diagram showing a touch panel of a second embodiment of the present invention.
Figure 4:
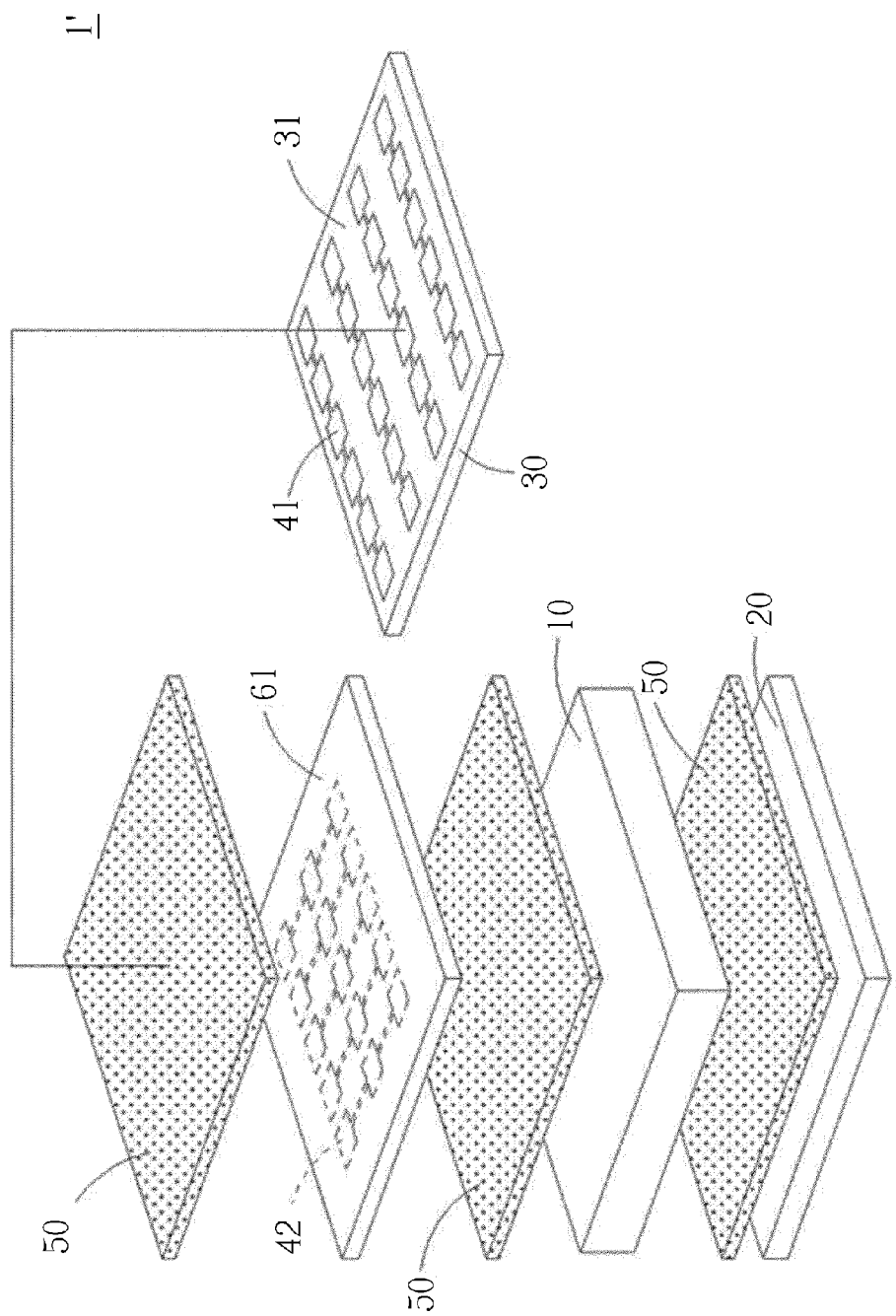
FIG. 4 is an exploded view diagram of the touch panel of the second embodiment of the present invention.

As shown in FIG. 3, which is a diagram showing a touch panel of a second embodiment of the present invention, the touch sensing structure 40 comprises upper transparent sensing series 41 and lower transparent sensing series 42, wherein the upper transparent sensing series 41 are formed on the upper polarizer 30, and the lower transparent sensing series 42 are formed on a first transparent substrate 61. As shown in FIG. 4, during manufacturing processes of the touch panel 1', the liquid crystal unit 10 and the lower polarizer 20 are also first provided to affix the lower polarizer 20 under the liquid crystal unit 10 by an adhesive layer 50. The upper polarizer 30 is then provided for sequentially forming a transparent conductive layer (not shown) and a metal layer (not shown) on a lower surface 31 of the upper polarizer 30, and the transparent conductive layer and the metal layer are patterned to form the upper transparent sensing series 41 and upper periphery wires on the lower surface 31. The first transparent substrate 61 is then provided for sequentially forming a transparent conductive layer (not shown) and a metal layer (not shown) on the first transparent substrate 61, and the transparent conductive layer and the metal layer are patterned to form the lower transparent sensing series 42 and lower periphery wires on the first transparent substrate 61. The process of patterning can be a roll-to-roll photolithography process or a print etching process. The upper transparent sensing series 41 and the lower transparent sensing series 42 are intersected, and the upper polarizer 30 is affixed to the first transparent substrate 61 by the adhesive layer 50 in a roll-to-roll adhesion manner, wherein the adhesive layer 50 can be arranged with openings for allowing upper gold fingers and lower gold fingers to be electrically connected to a flexible printed circuit board. Therefore, a touch sensor panel with a polarizing function (the upper polarizer 30 carrying the touch sensing structure 40) is formed. Through utilizing the adhesive layer 50 to affix the touch sensor panel with the polarizing function above the liquid crystal unit 10, with the lower polarizer 20 affixed under the liquid crystal unit 10, the touch panel 1' having high light transmittance and touch function is formed.

Figure 5:
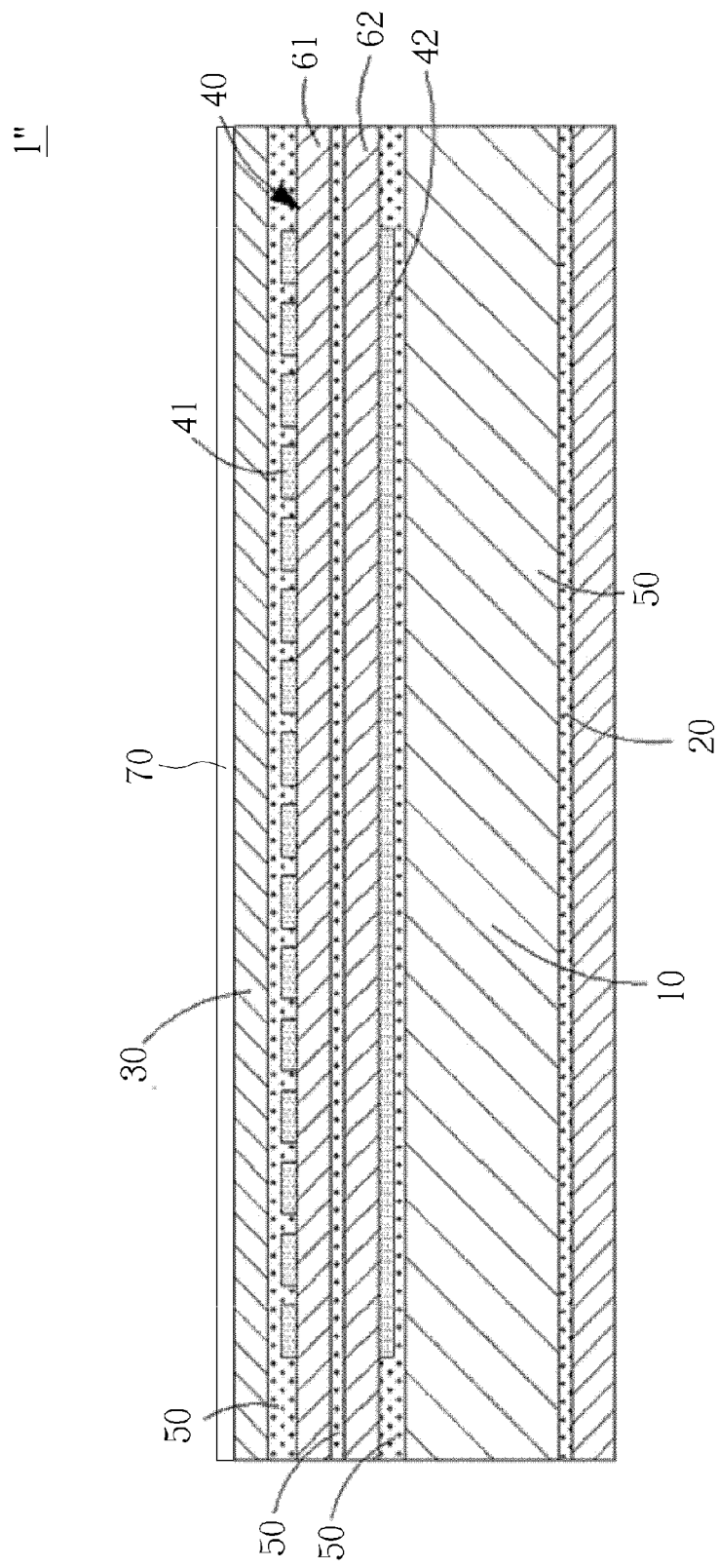
FIG. 5 is diagram showing a touch panel of a third embodiment of the present invention.
Figure 6:
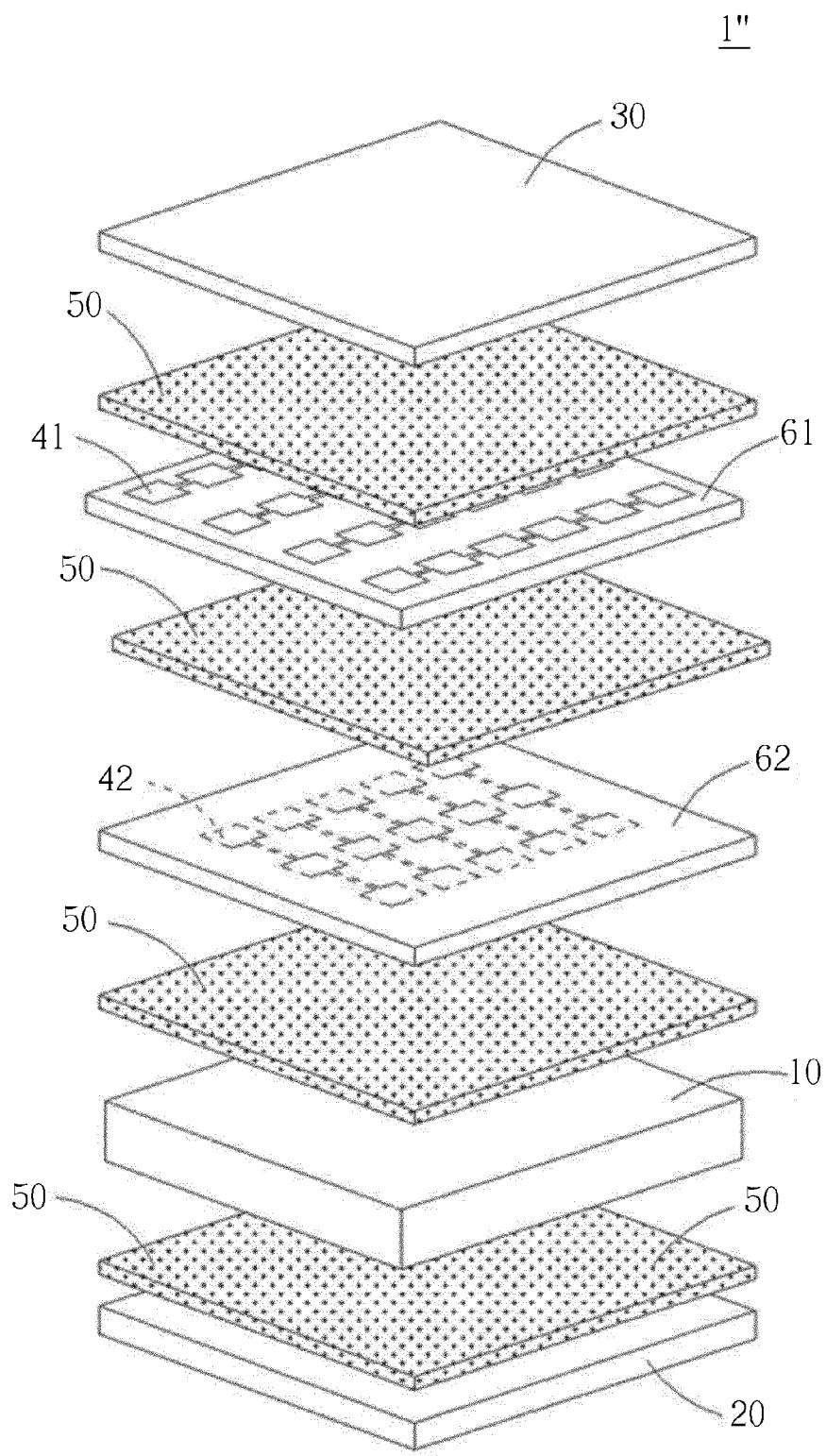
FIG. 6 is an exploded view diagram of the touch panel of the third embodiment of the present invention.

As shown in FIG. 5, which is a diagram showing a touch panel of a third embodiment of the present invention, the touch sensing structure 40 comprises upper transparent sensing series 41 and lower transparent sensing series 42, wherein the upper transparent sensing series 41 are formed on a first transparent substrate 61, and the lower transparent sensing series 42 are formed on a second transparent substrate 62. The first transparent substrate 61 and the second transparent substrate 62 can be made of PET, TAC, glass, PMMA or ARTON. As shown in FIG. 6, during manufacturing processes of the touch panel 1", the liquid crystal unit 10 and the lower polarizer 20 are also first provided to affix the lower polarizer 20 under the liquid crystal unit 10 by an adhesive layer 50. The upper polarizer 30 and a first transparent substrate 61 are then provided, and a transparent conductive layer (not shown) and a metal layer (not shown) are formed on the first transparent substrate 61. The transparent conductive layer and the metal layer are patterned to form the upper transparent sensing series 41 and upper periphery wires on the first transparent substrate 61. A second transparent substrate 62 is then provided for forming a transparent conductive layer (not shown) and a metal layer (not shown) on the second transparent substrate 62, and the transparent conductive layer and the metal layer are patterned to form the lower transparent sensing series 42 and lower periphery wires on the second transparent substrate 62. The process of patterning can be the roll-to-roll photolithography process or the print etching process. The upper periphery wires and the lower periphery wires are electrically connected to the upper transparent sensing series 41 and the lower transparent sensing series 42 respectively, and other ends of the upper periphery wires and the lower periphery wires are electrically connected to upper gold fingers and lower gold fingers respectively. The upper transparent sensing series 41 and the lower transparent sensing series 42 are intersected. The upper polarizer 30, the first transparent substrate 61 and the second transparent substrate 62 are affixed together by the adhesive layers 50 in a roll-to-roll adhesion manner, wherein the adhesive layers 50 can be arranged with openings for allowing the upper gold fingers and the lower gold fingers to be electrically connected to a flexible printed circuit board. Therefore, a touch sensor panel with the polarizing function is formed. Through utilizing the adhesive layer 50 to affix the upper polarizer 30, which carries the touch sensing structure 40, above the liquid crystal unit 10, with the lower polarizer 20 affixed under the liquid crystal unit 10, the touch panel 1″ having high light transmittance and touch function is formed.

Moreover, the above first transparent substrate and the second transparent substrate can be made of a low-retardation material, such as PET, TAC, glass, PMMA or ARTON, in order to further increase clarity of the whole touch panel. A protective layer 70 such as a cover lens can be installed above the upper polarizer for protecting the touch panel. The protective layer 70 can be made of glass, tempered glass, PC, PMMA or a composite material of PC and PMMA.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
    a liquid crystal unit;
    a lower polarizer, installed under the liquid crystal unit;
    an upper polarizer, installed above the liquid crystal unit; and
    a touch sensing structure, installed under the upper polarizer;
    wherein the touch sensing structure comprises an upper transparent sensing series and a lower transparent sensing series, wherein the upper transparent sensing series is formed on a first transparent substrate, the lower transparent sensing series is formed on a second transparent substrate, and the second transparent substrate is affixed under the first transparent substrate.

2. The touch panel of claim 1, wherein the first transparent substrate and the second transparent substrate are made of a low-retardation material.

3. The touch panel of claim 1, wherein the upper transparent sensing series and the lower transparent sensing series are intersected.

4. The touch panel of claim 1 further comprises a protective layer installed above the upper polarizer.

5. A manufacturing method of a touch panel, comprising:
    providing a liquid crystal unit;
    providing a lower polarizer affixed under the liquid crystal unit;
    providing an upper polarizer having a lower surface, wherein an upper transparent sensing series is formed on the lower surface by a roll-to-roll photolithography process;
    providing a first transparent substrate, wherein a lower transparent sensing series is formed on the first transparent substrate by the roll-to-roll photolithography process;
    affixing the upper polarizer and the first transparent substrate by roll-to-roll adhesion; and
    affixing the upper polarizer and the first transparent substrate above the liquid crystal unit.

6. A manufacturing method of a touch panel, comprising:
    providing a liquid crystal unit;
    providing a lower polarizer affixed under the liquid crystal unit;
    providing an upper polarizer;
    providing a first transparent substrate, wherein an upper transparent sensing series is formed on the first transparent substrate;
    providing a second transparent substrate, wherein a lower transparent sensing series is formed on the second transparent substrate;
    affixing the upper polarizer, the first transparent substrate and the second transparent substrate together by roll-to-roll adhesion; and
    affixing the upper polarizer, the first transparent substrate and the second transparent substrate above the liquid crystal unit.

* * * * *